(12) United States Patent
Chen et al.

(10) Patent No.: US 7,564,679 B2
(45) Date of Patent: Jul. 21, 2009

(54) FLAT PANEL DISPLAY HAVING SLIDING STRUCTURE

(75) Inventors: Yung-Hsiang Chen, Miao-Li (TW);
Che-Min Huang, Miao-Li (TW);
Yun-Ling Liang, Miao-Li (TW);
Ming-Chih Huang, Miao-Li (TW);
Chen-Yu Wu, Miao-Li (TW);
Hsiao-Ching Hung, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 249 days.

(21) Appl. No.: 11/644,232

(22) Filed: Dec. 22, 2006

(65) Prior Publication Data

US 2007/0146979 A1  Jun. 28, 2007

(30) Foreign Application Priority Data

Dec. 23, 2005  (TW) .............................. 94146361 A

(51) Int. Cl.
*G06F 1/16* (2006.01)

(52) U.S. Cl. .................................. 361/679.21; 248/917
(58) Field of Classification Search .................. 361/681
See application file for complete search history.

(56) References Cited

U.S. PATENT DOCUMENTS

| 6,134,103 | A  | * | 10/2000 | Ghanma ...................... 361/681 |
| 6,312,270 | B1 |   | 11/2001 | Hamon |
| 7,124,984 | B2 | * | 10/2006 | Yokouchi et al. ......... 248/125.8 |
| 7,424,991 | B2 | * | 9/2008  | Kim et al. ................. 248/125.9 |
| 7,430,113 | B2 | * | 9/2008  | McRight et al. ............. 361/683 |
| 2004/0011932 | A1 | * | 1/2004 | Duff ........................... 248/157 |
| 2007/0045488 | A1 | * | 3/2007 | Shin ......................... 248/176.1 |
| 2007/0194182 | A1 | * | 8/2007 | Lee .......................... 248/125.9 |
| 2008/0117574 | A1 | * | 5/2008 | Lee ............................. 361/681 |

* cited by examiner

*Primary Examiner*—Lisa Lea-Edmonds
(74) *Attorney, Agent, or Firm*—Wei Te Chung

(57) ABSTRACT

An exemplary flat panel display (1) includes a display body (10) and a stand (12) supporting the display body. The stand includes a base (13), and a slider (14) slidably engaged to the base. The slider is configured for moving the display body upwardly or downwardly relative to the base.

13 Claims, 7 Drawing Sheets

FLAT PANEL DISPLAY HAVING SLIDING STRUCTURE

FIELD OF THE INVENTION

The present invention relates to a flat panel display having a display body and a sliding structure, the sliding structure being configured for moving the display body up or down as desired.

GENERAL BACKGROUND

Flat panel displays are commonly used as display devices for compact electronic apparatuses. Referring to FIG. 7, a typical flat panel display 7 includes a display body 72, a neck 74, and a base 76. The neck 74 is integrally formed with the base 76, and is connected with the display body 72 by a pivot axis 78. The display body 72 and the neck 74 are supported by the base 76, and can be rotated around the pivot axis 78.

It is widely held that a healthy position for a user to view a screen of the display body 72 is such that a horizontal centerline of the display body 72 is slightly below a horizontal line of sight of the user. However, the flat panel display 7 is not configured to be readily adjustable to achieve this desired position. It can be troublesome and time-consuming for the user to try to adjust a working height of the display body 72 of the flat panel display 7.

What is needed, therefore, is a flat panel display that can overcome the above-described deficiencies.

SUMMARY

In an exemplary embodiment, a flat panel display includes a display body and a stand supporting the display body. The stand includes a base, and a slider slidably engaged to the base. The slider is configured (i.e., structured and arranged) for moving the display body upwardly or downwardly relative to the base.

Other aspects, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
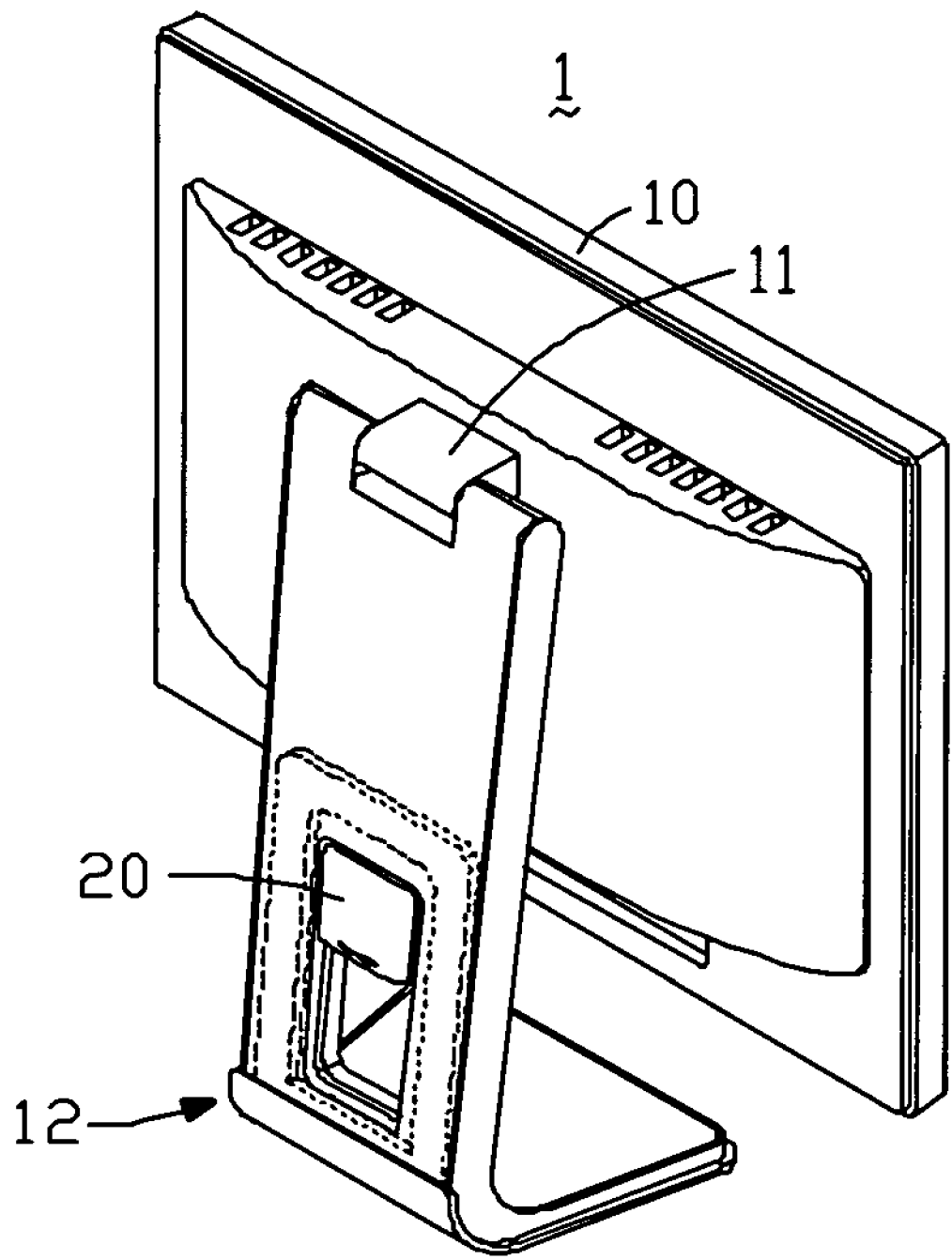
FIG. 1 is an isometric view of a flat panel display according to an exemplary embodiment of the present invention, the flat panel display including a display body and a stand.

Referring to FIG. 1, a flat panel display 1 according to an exemplary embodiment of the present invention is shown. The flat panel display 1 includes a display body 10, a pivot axis 11, and a stand 12. The display body 10 is connected with the stand 12 by the pivot axis 11, and is supported by the stand 12.

Figure 2:
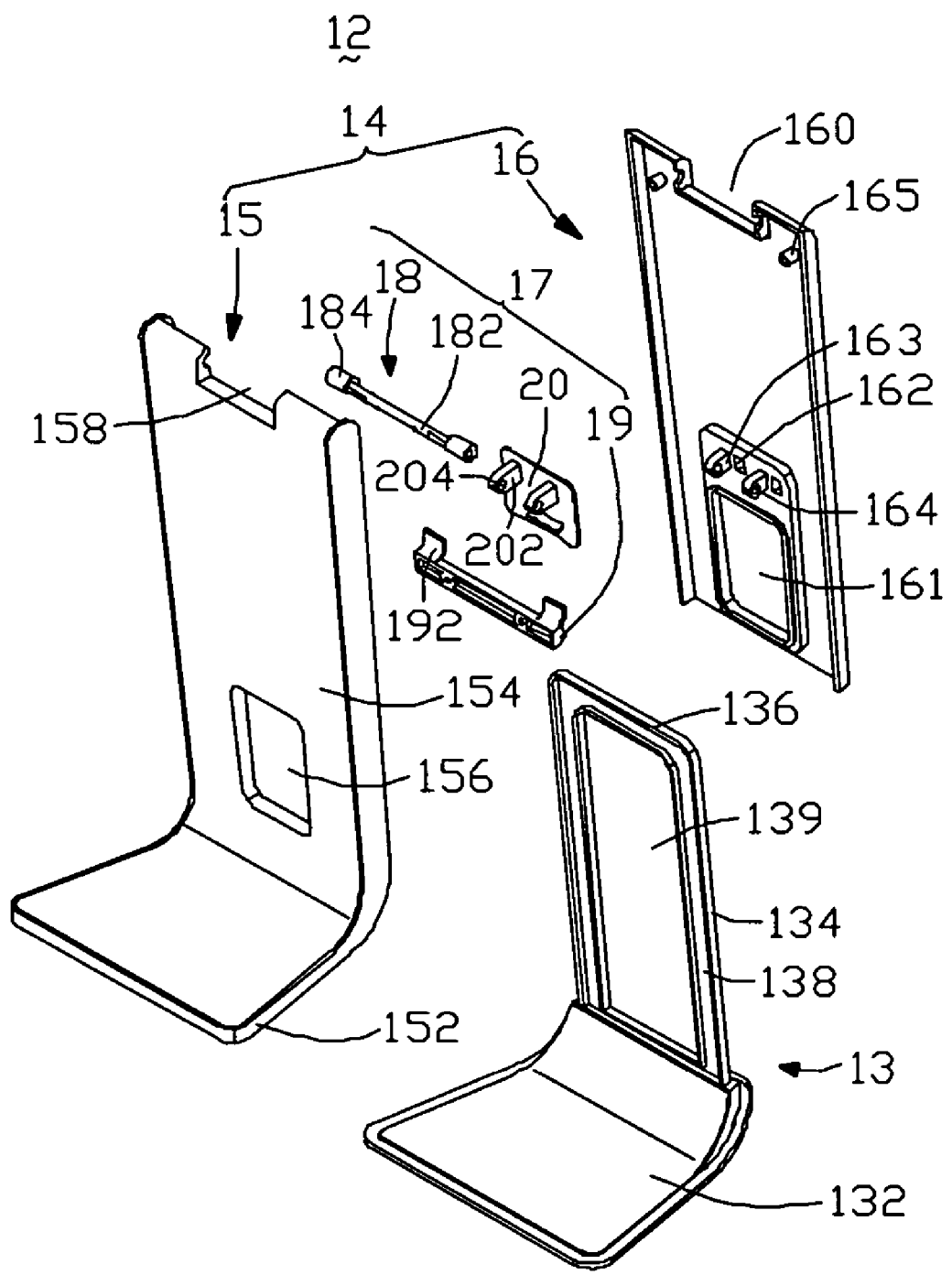
FIG. 2 is an exploded, isometric view of the stand of FIG. 1, the stand including a first shell, a second shell, and a slide stopper.

Referring also to FIG. 2, the stand 12 includes a base 13 and a slider 14. The base 13 includes a first tray 132, two vertical arms 134, and a horizontal arm 136. The vertical arms 134 are bar-shaped, and upwardly extend in parallel from a top edge (not labeled) of the first tray 132. The horizontal arm 136 integrally interconnects the two vertical arms 134, thereby defining an essentially rectangular first opening 139. The vertical arms 134 and the horizontal arm 136 cooperatively define an essentially U-shaped slide way 138 therein.

The slider 14 includes a first shell 15, a second shell 16 located opposite to the first shell 15, and a brake 17 located between the first shell 15 and the second shell 16. The first shell 15 includes a second tray 152, and a main plate 154 upwardly extending from an edge (not labeled) of the second tray 152. A horizontal width of the main plate 154 is greater than a length of the horizontal arm 136. The second tray 152 has a shape corresponding to that of the first tray 132 of the base 13, and a size thereof is slightly less than a size of the first tray 132. In the illustrated embodiment, the main plate 154 is essentially rectangular. The main plate 154 defines a second rectangular opening 156 in a lower portion thereof, and a first notch 158 at a top edge thereof. Two first location poles (not shown) outwardly extend from a back surface of the main plate 154.

The second shell 16 is essentially rectangular, and has a shape corresponding to that of the main plate 154 of the first shell 15. The second shell 16 defines a second notch 160, a third opening 161, and two first through holes 162. The second notch 160 corresponds to the first notch 158 of the first shell 15. The second notch 160 and the first notch 158 can cooperatively receive and fix the pivot axis 11. The third opening 161 corresponds to the second opening 156 of the first shell 15. The two first through holes 162 are horizontally defined in the second shell 16, and are located above the third opening 161. Two first protrusions 163 outwardly extend from an inner surface (not labeled) of the second shell 16. The first protrusions 163 are horizontally arranged, and are spaced by one of the first through holes 162. The first protrusions 163 each define a second through hole 164 therein, and centers of the second through holes 164 are essentially collinear. The second shell 16 further includes two second location poles 165 outwardly extending from the inner surface thereof. The second location poles 165 correspond to their respective first location poles of the first shell 15, and each define a location hole (not labeled) therein. The location hole can fittingly receive one respective first location pole.

The brake 17 includes a friction bar 18, a slide guide 19, and a slide stopper 20. The friction bar 18 includes an essentially cylindrical main body 182, and two caps 184 located at two ends of the main body 182. The main body 182 of the friction bar 18 can extend through the second through holes 164 of the first protrusions 163. Each cap 184 is a cam mechanical structure. One of the caps 184 is detachable. In an alternative embodiment, the caps 184 of the friction bar 18 are both detachable.

The slide guide 19 has an essentially semi-cylindrical profile, and has a length substantially equal to that of the friction bar 34. The slide guide 19 defines two first threading holes (not labeled) corresponding to two second threading holes (not shown) defined in the first shell 15, so that the slide guide 19 can be threadingly engaged to the back surface of the first shell 15 by a thread bolt (not shown). The slide guide 19 further includes two curved elastic flanges 192 located at two ends thereof. The flanges 192 correspond to their respective caps 184 of the friction bar 18, and can be received in the slide way 138 of the base 13.

The slide stopper 20 is essentially rectangular, and includes two second protrusions 202 outwardly extending from a main surface thereof. The second protrusions 202 are horizontally arranged, and each second protrusion 202 defines a third through hole 204 therein. Centers of the third through holes 204 of the second protrusions 202 are essentially collinear. The second protrusions 202 correspond to the first through holes 162 of the second shell 16.

The stand 12 can be assembled as follows. First, the base 13 is slidably engaged to the second shell 16, so that the slide way 138 faces the first shell 15. Second, the second protrusions 202 of the slide stopper 20 extend through the first through holes 162 from a back side of the second shell 16, so that the centers of the second through holes 164 and those of the third through holes 204 are essentially collinear. Third, one of the caps 184 is detached, and the main body 182 of the friction bar 18 extends through the second through holes 164 and the third through holes 204. Then the detached cap 184 is mounted to the main body 182 again. Fourth, the slide guide 19 is threadingly engaged to the back surface of the first shell 15, so that the flanges 192 of the slide guide 19 protrude toward the slide way 138. Fifth, the flanges 192 upwardly enter two gaps (not labeled) respectively between the caps 184 and the slide way 138. Finally, the first shell 15 having the slide guide 19 is engaged to the second shell 16. The first location poles are engaged into the location holes in the second location poles 165. The flanges 192 of the slide guide 19 are received in the slide way 138, and fittingly abut the caps 184.

Figure 3:
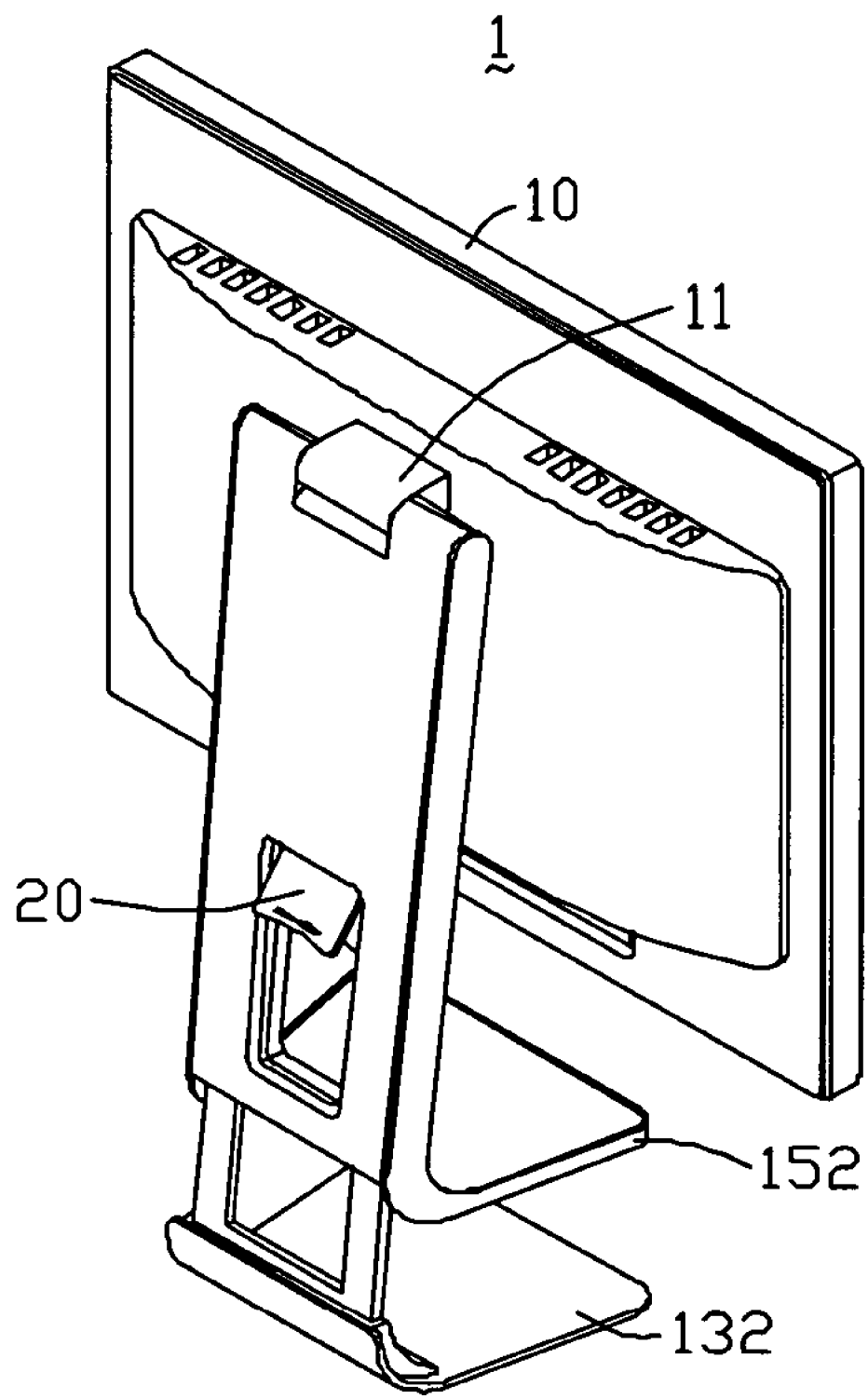
FIG. 3 is similar to FIG. 1, but showing the flat panel display when the slide stopper is in a first state.
Figure 4:
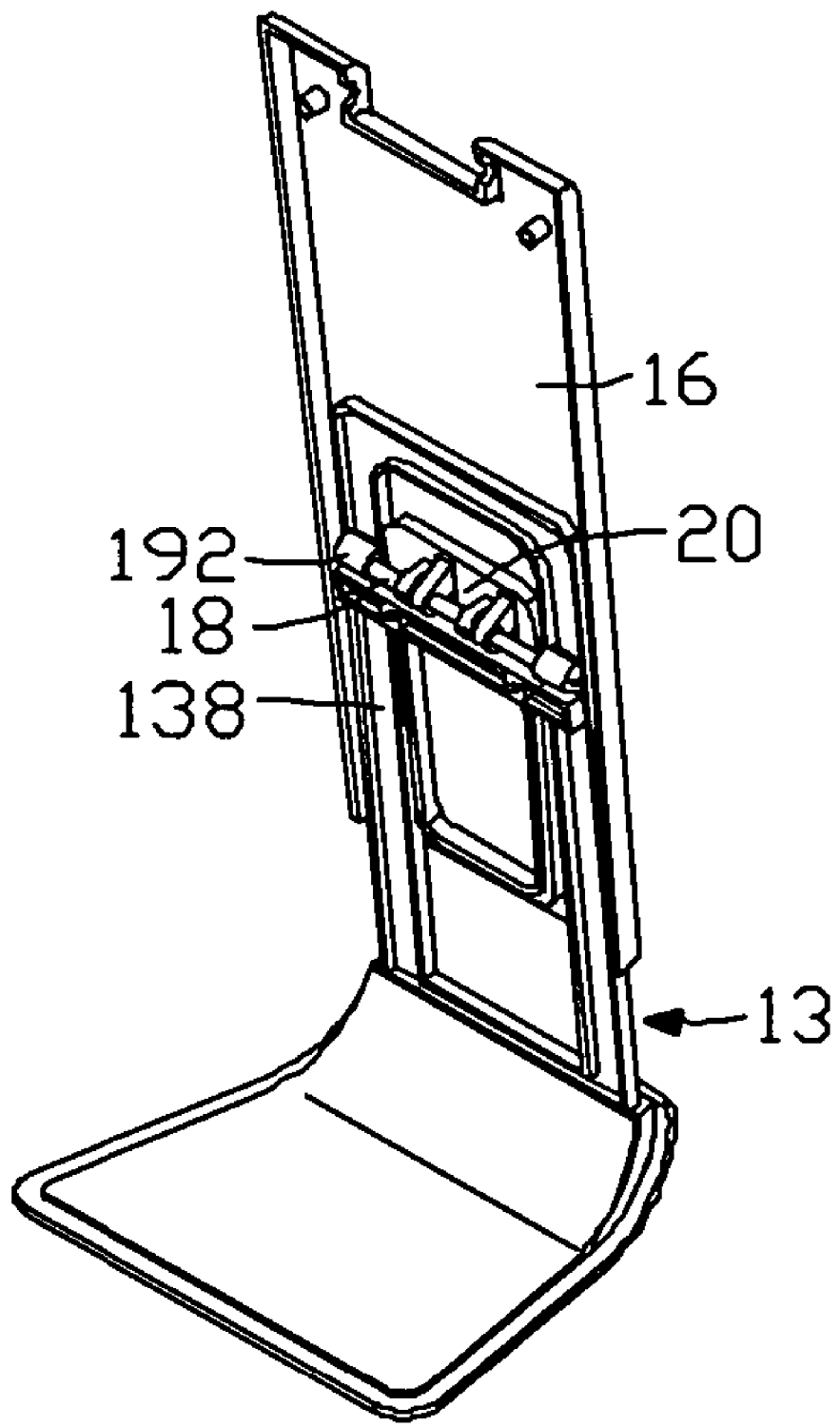
FIG. 4 is an isometric view of the second shell and the slide stopper of FIG. 2, showing the second shell and the slide stopper in the first state.
Figure 5:
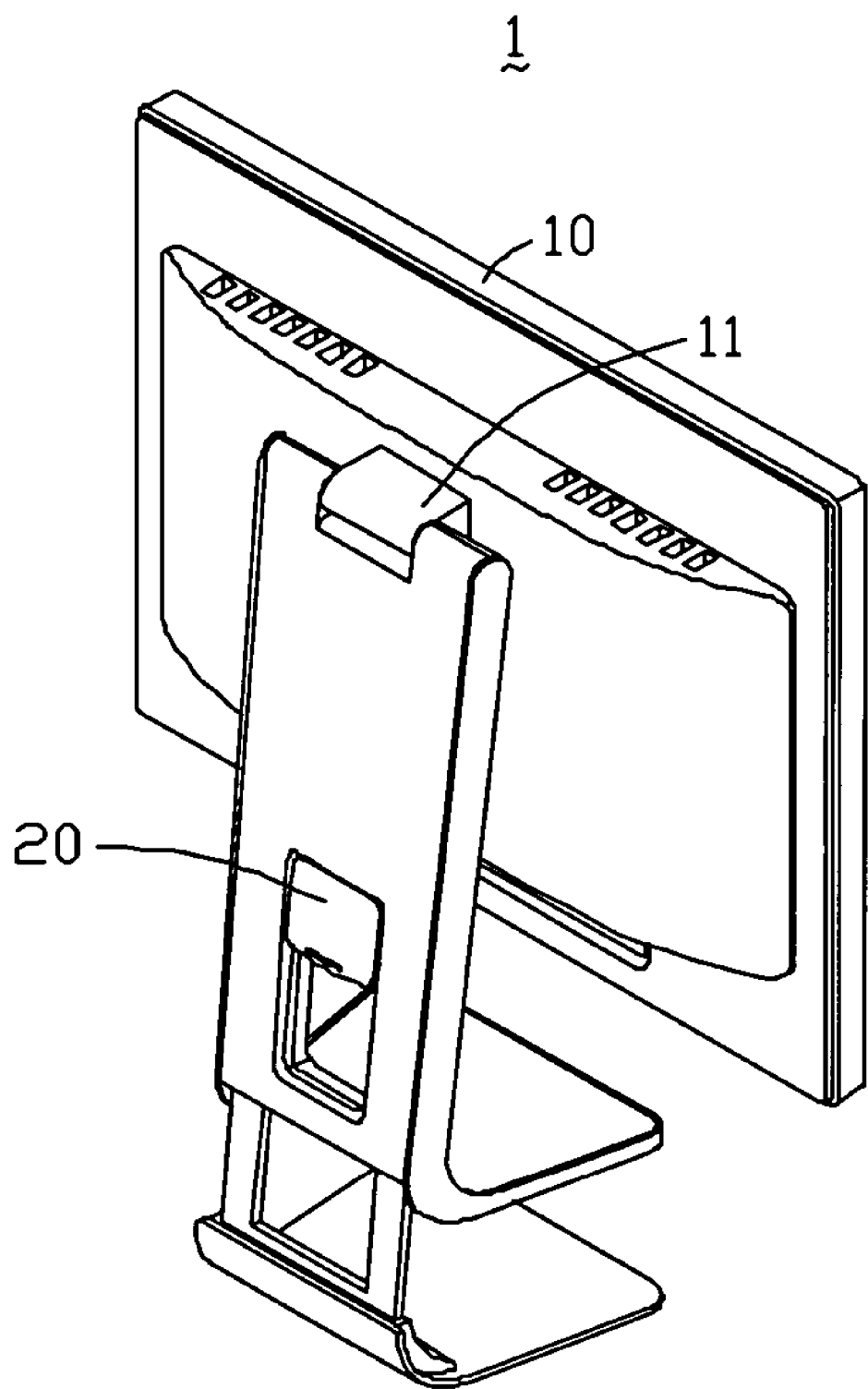
FIG. 5 is similar to FIG. 3, but showing the flat panel display when the slide stopper is in a second state.
Figure 6:
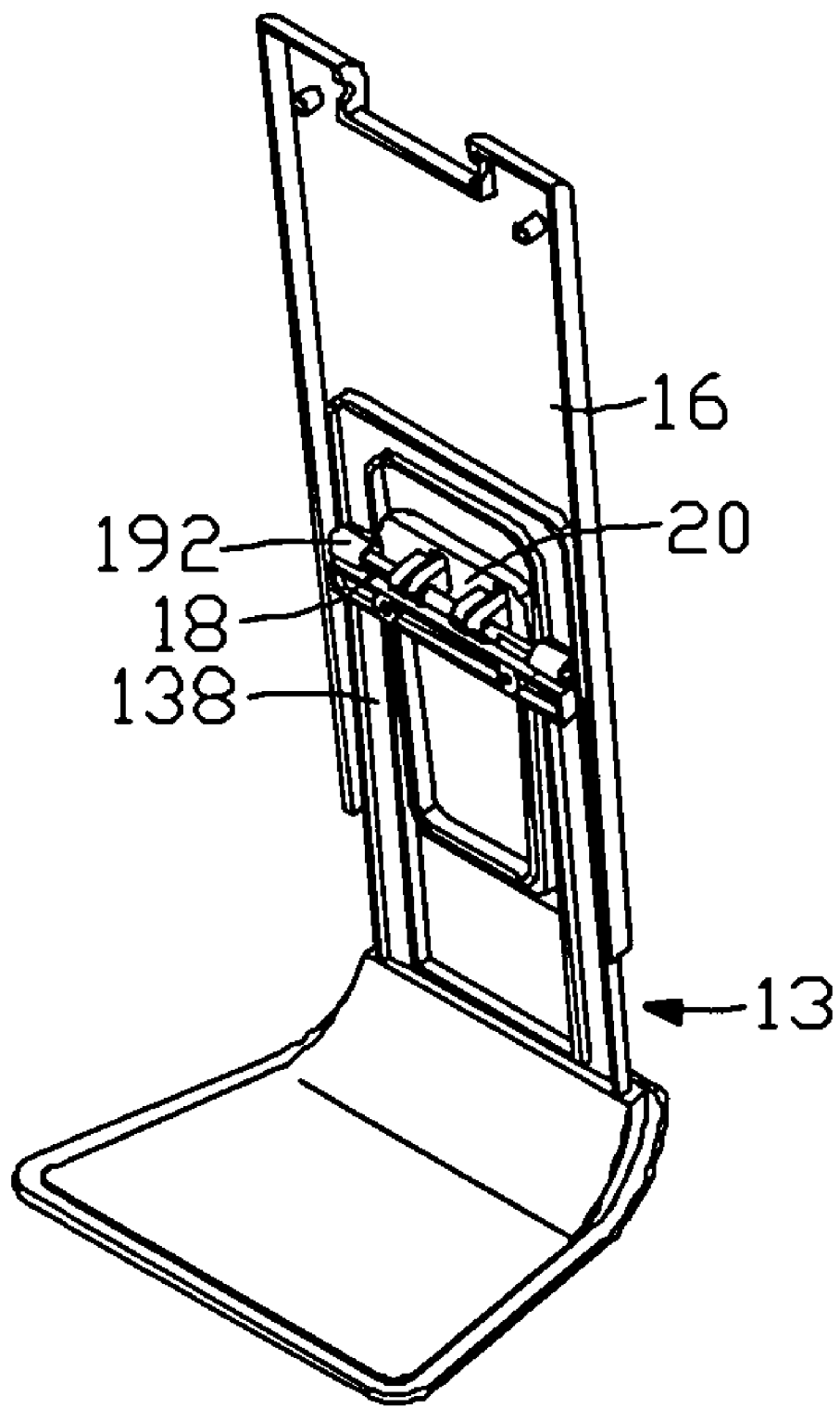
FIG. 6 is similar to FIG. 4, but showing the second shell and the slide stopper in the second state.
Figure 7:
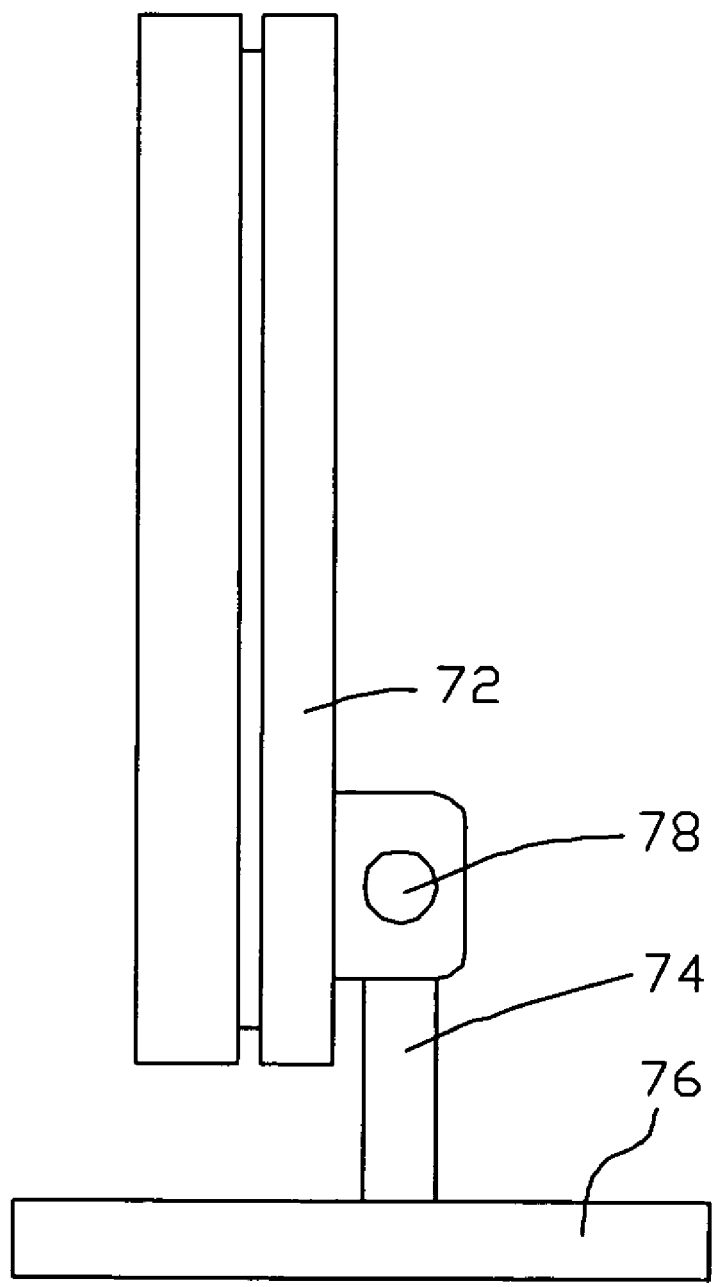
FIG. 7 is a side plan view of a conventional flat panel display.

Referring also to FIG. 3 and FIG. 4, the flanges 192 are released from the slide way 138 after a bottom portion of the slide stopper 20 is pressed toward first shell 15. Thus, the first shell 15 and the second shell 16 can upwardly or downwardly slide along the slide way 138. That is, a horizontal central line (not shown) of the display body 10 can be adjusted up or down as desired. In FIG. 5 and FIG. 6, the flanges 192 are arrested by the respective flanges 192 after the bottom portion of the slide stopper 20 is pressed back to its original position. Thus, the first shell 15 and the second shell 16 are stopped from sliding along the slide way 138. That is, the horizontal central line of the display body 10 can stay in a desired position.

In summary, the horizontal central line of the display body 10 can be conveniently adjusted by simply pressing the slide stopper 20. This makes the flat panel display 1 suitable for operators with different heights, who can each readily obtain an optimum viewing position for the display body 10. Furthermore, a distance between the first tray 132 and the second tray 152 can be adjusted so that they can cooperatively function as a clip. This enables the flat panel display 1 to be conveniently attached to a suitable fixed object.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A flat panel display comprising:
   a display body; and
   a stand supporting the display body, the stand comprising:
      a base defining two parallel slide ways therein; and
      a slider slidably engaged to the base and configured for moving the display body upwardly or downwardly relative to the base.

2. The flat panel display in claim 1, wherein the base comprises two parallel arms that define the slide ways.

3. The flat panel display in claim 1, wherein the slider comprises a first shell, engaged to the first shell, and a brake, the brake being received between the first shell and the second shell, and determining the slider moveable relative to the base or not.

4. The flat panel display in claim 1, wherein the slider comprises a first shell, a second shell engaged to the first shell, and a brake, the brake comprising a friction bar engaged to the second shell, and determining the slider moveable relative to the base or not.

5. The flat panel display in claim 4, wherein the friction bar comprises two caps located at two ends thereof.

6. The flat panel display in claim 5, wherein at least one of the caps comprises a cam mechanical structure.

7. The flat panel display in claim 5, wherein at least one of the caps is detachable.

8. The flat panel display in claim 7, wherein the brake further comprises a slide guide engaged to the first shell.

9. The flat panel display in claim 8, wherein the slide guide comprises two flanges at two ends thereof, the flanges corresponding to the caps.

10. The flat panel display in claim 9, wherein the flanges. are elastic

11. The flat panel display in claim 9, wherein the second shell defines an opening therein, the opening corresponding to the slide stopper.

12. The flat panel display in claim 9, wherein the brake further comprises a slide stopper engaged to the second shell.

13. The flat panel display in claim 12, wherein the slide stopper is configured to selectively allow the slider to move relative to the base or stop the slider from moving relative to the base.

* * * * *